(No Model.)　　　　　　　　　　　　　　　3 Sheets—Sheet 1.
R. H. CANFIELD
SWITCH STAND.
No. 504,964.　　　　　　　　　　Patented Sept. 12, 1893.
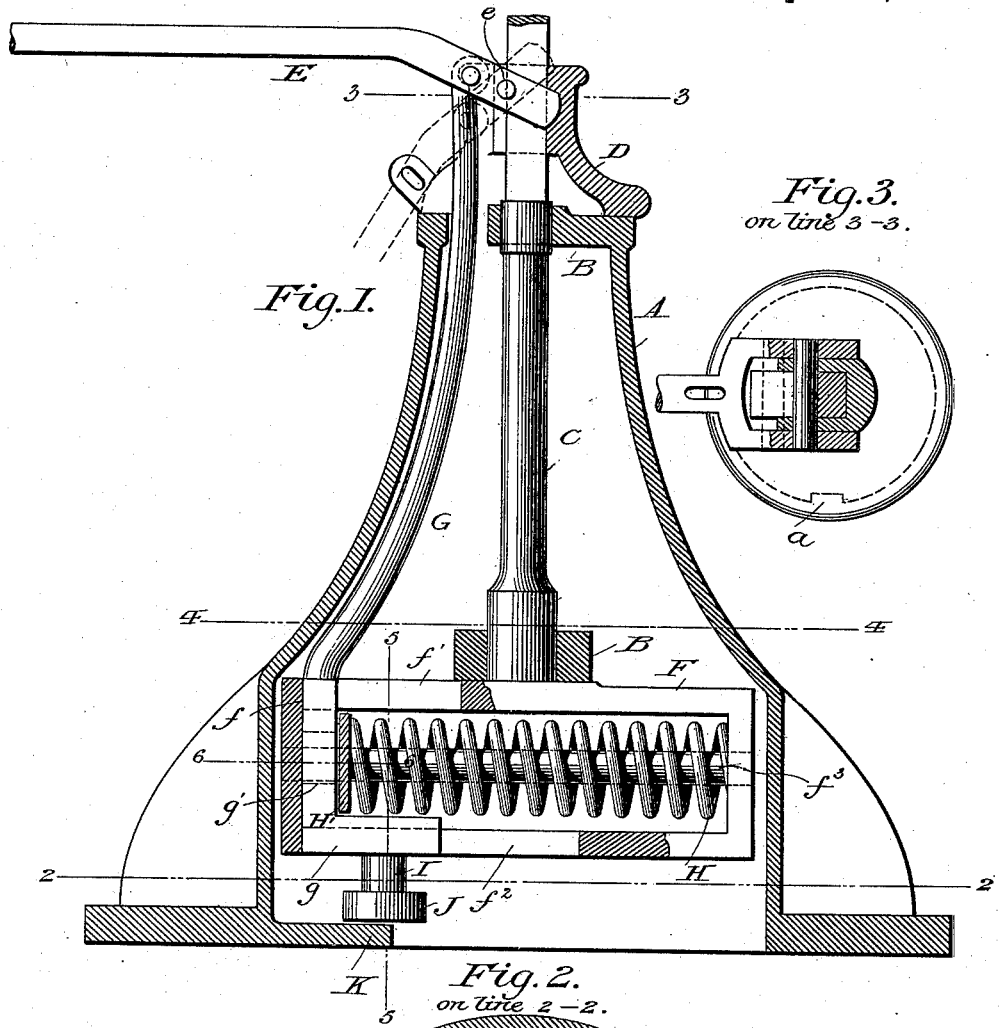
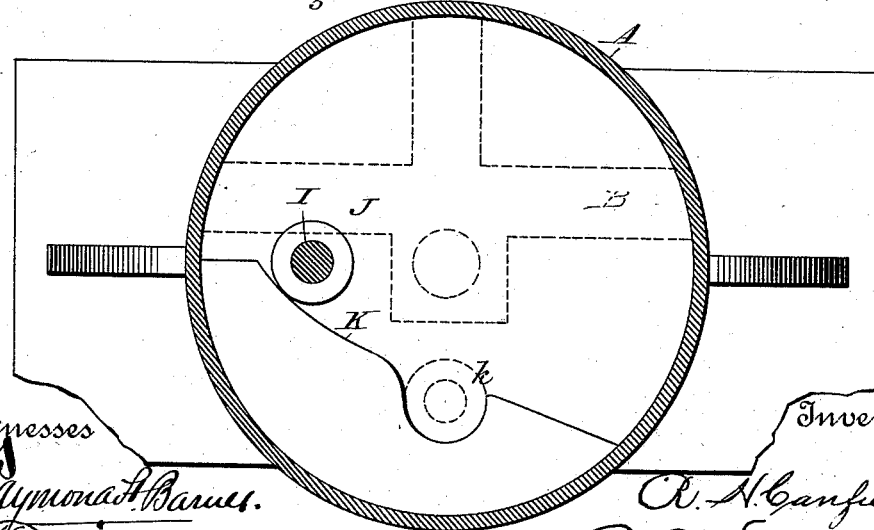
Witnesses　　　　　　　　　　　　　　　Inventor

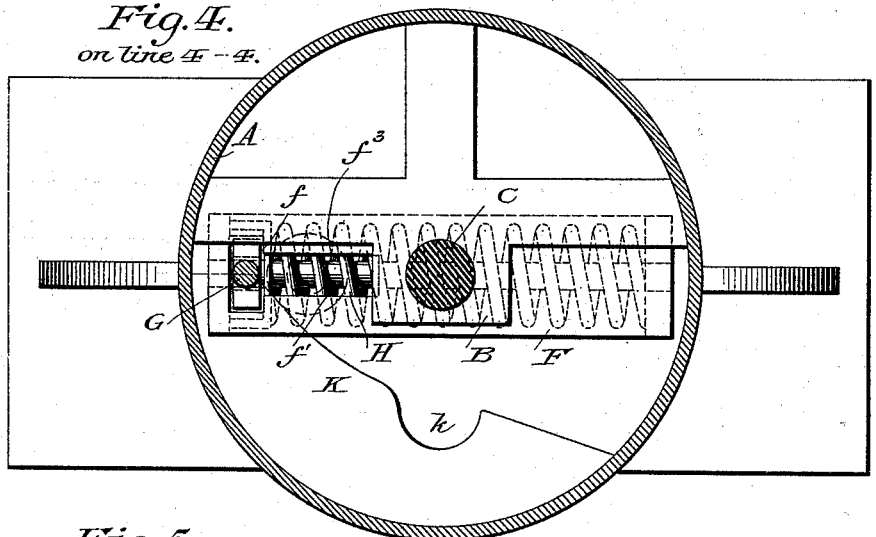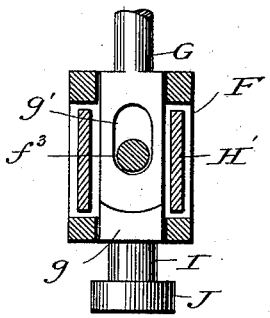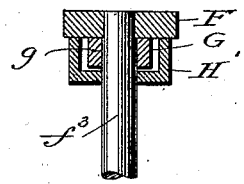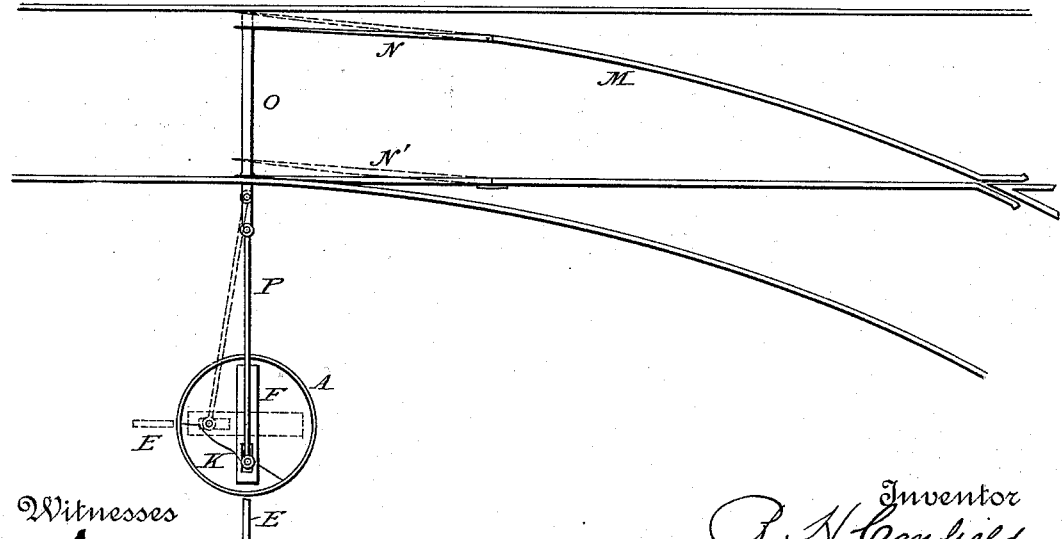

(No Model.) R. H. CANFIELD. 3 Sheets—Sheet 3.
SWITCH STAND.

No. 504,964. Patented Sept. 12, 1893.

Witnesses
Raymond F. Barnes.
F. Stanley Elmore.

Inventor
R. H. Canfield
By P. F. Dodge
Attorney

UNITED STATES PATENT OFFICE.

ROBERT H. CANFIELD, OF CORNING, NEW YORK.

SWITCH-STAND.

SPECIFICATION forming part of Letters Patent No. 504,964, dated September 12, 1893.

Application filed September 8, 1892. Serial No. 445,292. (No model.)

*To all whom it may concern:*

Be it known that I, ROBERT H. CANFIELD, of Corning, county of Steuben, and State of New York, have invented a new and useful Improvement in Switch-Stands, of which the following is a specification.

My invention relates to switch stands, and, more particularly, to what are known as "safety switches."

The invention consists in combining with a lever adapted to be connected with the movable switch rails, a spring acting on said lever and movable around an axis bodily therewith.

The invention also consists in providing for the momentary yielding of the switch when set for the main line in order to admit of the passage of the train from the siding without permanently altering the position of the switch to the end that it may be left set for the main line after the train has passed from the siding.

The invention also consists in the details of construction and combination of parts hereinafter described and claimed.

Figure 8:
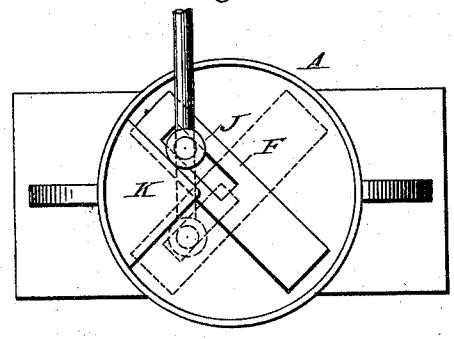
Figure 9:
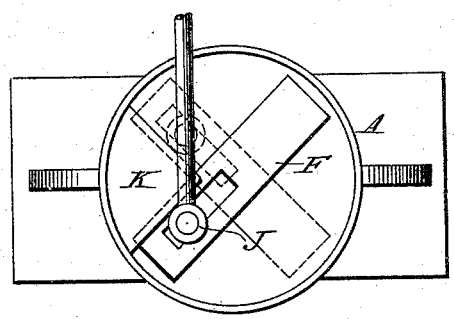
Figure 10:
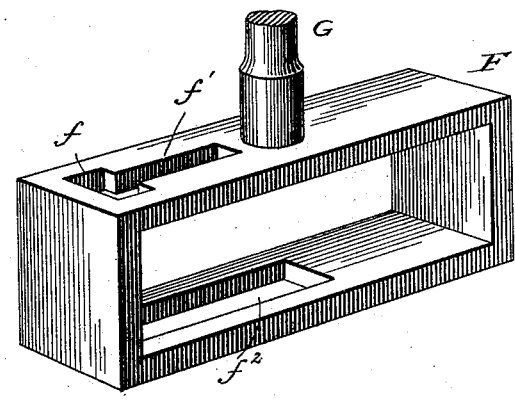

In the accompanying drawings,—Figure 1 is a longitudinal vertical section through a switch-stand with my invention embodied therein, the usual target or signal being removed. Fig. 2 is a horizontal section on the line 2—2. Fig. 3 is a horizontal section on the line 3—3 of Fig. 1. Fig. 4 is a horizontal section on the line 4—4 of Fig. 1. Fig. 5 is a vertical section on the line 5—5 of Fig. 1. Fig. 6 is a horizontal section on the line 6—6 of Fig. 1. Fig. 7 is a view in the nature of a diagram showing the main line, siding, the switch-stand and its connections with the track. Fig. 8 is a view showing a modification of my device. Fig. 9 is a similar view showing the parts in different positions. Fig. 10 is a perspective view of a detail.

Referring to the drawings,—A represents an upright hollow casting or frame, which may be of any suitable form adapted to sustain the operative parts of the device hereinafter described.

B B' represent two bearings projecting within the frame in which is loosely mounted a vertical shaft C. This shaft extends upward through a cap D, seated upon the upper edge of the frame to turn thereon, and is adapted at its upper end to receive a target which may be of the usual construction. Adjacent to the cap the shaft is flattened and arranged to be embraced by the forked end of a switch-operating lever E, mounted on a horizontal pivot $e$, fixed in the cap. Under this construction it will be seen that the lever may be moved on its horizontal pivot and rotated bodily around a vertical axis carrying with it the cap D, and turning the shaft C, around the vertical axis passing through its center.

The upper edge of the frame A is notched, as shown at $a$, and is adapted to receive the operating lever E when it is depressed. The notch is in such position with relation to the parts of the device that when the lever enters the same the switch will be set for the main line so that it will not be possible to lock the switch in other positions.

At the lower end beneath the bearing B' the shaft is provided with a transverse spring-carrying frame F, rigidly attached thereto. This frame is shown at Fig. 10, and has its ends extending downward and inward. The upper portion of the spring carrying frame at one side is provided with an opening or slot $b$, which communicates with a longitudinal slot $f'$, while the lower portion of the frame beneath these slots is provided with a slot $f^2$. These slots are adapted to receive and guide the lower end of a vertical lever G, which is provided with a horizontal foot $g$, standing in the slot $f^2$, the adjacent vertical portion of the lever standing in the transverse slot $f$. Above the spring-carrying frame the lever is reduced so that it may when lowered enter the longitudinal slot $f'$, as more fully described hereinafter. At its upper end the lever is pivoted to the switch-operating lever E, so that as the switch-operating lever is raised or lowered the lever G will be elevated or depressed, it moving at its lower end vertically within the slots in the spring-carrying frame.

The vertical portion of the lever G within the spring-carrying frame is provided with a vertical slot $g'$, through which is extended a horizontal rod $f^3$, fixed at its ends to the spring-carrying frame. This rod is encircled by a spiral spring H, one end of which bears against the frame while its opposite end bears against an angular washer H', seated against the frame and extending along the sides of the lever, thus relieving the latter from the direct pressure of the spring, and enabling it to move freely vertically. A pin I, extends downward from the under side of the horizontal foot of the lever and is provided on its end with a roller J, which is arranged, when the lever is in its lower position, to move along the edge of a cam K, fixed to the bottom of the casing or frame. This cam extends diagonally across the frame and is formed with the recess $k$ to receive the roller and with an inclined edge along which the roller may freely move. Under this construction, assuming that the roller is seated in the recess in the cam, it will be seen that owing to its connection with the vertically-moving lever the roller may be lifted out of contact with the cam by raising the switch-operating lever, and by turning the latter the spring-carrying frame may be turned bodily on a vertical axis with the shaft. When the switch operating lever in its new position is again lowered the roller will be caused to engage the inclined or eccentric edge of the cam as shown in full lines in Fig. 2, and dotted lines in Fig. 4. It will also be seen that when seated in the recess the roller may yield to a limited extent toward the center of the frame, thereby compressing the spring, which in tending to resume its normal seat will again cause the roller to enter the recess.

My switch-stand is connected to the track, as shown in Fig. 7, in which L represents the main line, M, the siding, N N' the two movable switch rail sections pivoted respectively to one of the rails of the siding and one of the main line rails, constituting what is known in the art as the "split" or "point" switch. The points of the switch rails are connected by a transverse bar O, to the end of which is pivoted a rod P, having its opposite end pivoted to the pin extending from the shoe of the spring-carrying frame.

The operation of my invention is as follows: Assuming that the switch is set for the main line, the spring-carrying frame will extend at right angles to the track, as shown in full lines in Fig. 7, with the roller J, seated in the recess in the cam. When it is desired to set the switch for the siding, the switch-operating lever E, is first lifted thereby raising the roller out of engagement with the cam, and then rotated to the position indicated in dotted lines in Fig. 7, which action will cause the points of the switch rails to occupy the position shown by dotted lines in said figure. The switch operating lever is then lowered and the roller engages the inclined edge of the cam being held outward against the same by the spring so that it tends to hold the parts in position and resist a closing motion of the switch. A train from the main line may then enter the siding. The flanges of the wheels of a train on the main line traveling in the opposite direction will push the points of the switch toward the stand thereby causing the spring-carrying frame to turn, the roller traveling along the edge of the cam and entering the recess therein, thus setting the switch to its original position for the main line. When the train passes from the siding onto the main line to continue its course, the flanges of the wheels will push the points of the switch rails away from the switch-stand thereby pulling the vertical lever G, toward the center of the stand, its reduced portion entering the longitudinal slot in the spring-carrying frame and compressing the spring H, which, in tending to resume its normal state will cause the roller to again enter the recess in the cam, thus leaving the switch set for the main line. It will thus be seen that a main line train passing after the first train has entered the siding will automatically set the switch from siding to main line, and that owing to the peculiar construction of my switch-stand the train from the siding will be permitted to again enter the main line without changing the position of the switch.

As a modification of the device when thus constructed to permit the train on the main line to automatically set the switch, I have constructed the device illustrated in Figs. 8 and 9. The switch-stand in this case may be identical in all respects to that first described with the exception of the cam surface, which, in the present case, is represented as being angular in form and projecting from the side of the frame. In the operation of this form of the stand, as indicated in full lines in Fig. 9, it is set for the siding by giving the switch-operating lever a quarter turn, the roller being carried over and around the cam. The train on the main line will push the switch rails toward the stand, thereby causing the roller to travel in opposite direction around the point of the cam, thus setting the switch to the main line.

It is to be noted as a peculiarity of my switch that the radially movable crank pin admits of the switch rail moving under the influence of the passing trains without requiring rotary motion of the crank or shaft or the unlocking of any of the other parts.

Having thus described my invention, what I claim is—

1. In combination with a switch, an operating crank provided with a radially movable spring-supported crank-pin, whereby the switch is permitted to move while the crank is at rest.

2. In combination with a switch, a switch rod, an operating crank provided with a crank-pin movable toward and from the center and a spring rotating with the crank and tending to prevent said movement of the crank pin.

3. In combination with switch rails, a switch rod, an operating shaft having a radially movable crank pin, a spring carried by the shaft and tending to hold the crank pin outward, and means for turning and locking the shaft.

4. A switch operating crank having a radially movable crank-pin, a cam surface co-operating therewith to resist the rotation of the crank, and a spring acting to hold the crank-pin outward substantially as described; whereby the spring is caused to serve the double purpose of locking the crank and switch in different positions and of permitting the switch to move without rotation of the crank.

5. In a switch-stand, the combination of the upright lever constructed to be connected to the switch rails, the spring-carrying frame mounted to turn on a vertical axis, the horizontal spring sustained by said frame and acting on the upright lever, and the cam arranged to be engaged by said lever.

6. In a switch-stand, the combination of the upright vertically moving lever, the horizontal spring-carrying frame within which said lever moves, the vertical shaft sustaining said frame and movable around a longitudinal central axis, the horizontal spring sustained by the frame and acting on the lever, the cam adapted to be engaged by the lever and the switch-operating lever connected to the upper end of the same.

7. In a switch stand, the combination of the vertical lever, the horizontal revoluble spring-carrying frame within which the lever is adapted to move vertically and horizontally, the horizontal spring carried by the frame and acting on the lever, the recessed cam, the roller on the lever adapted to engage the cam and enter the recess, and the switch-operating lever connected to the upright lever.

8. In a switch stand, the combination of the upright vertically moving lever, the horizontal spring-carrying frame through which the lever extends and revoluble on a vertical axis, the horizontal rod mounted in said frame and extending through the lever, the spiral spring encircling said rod and acting on the lever, the roller on the lower end of the lever, the cam adapted to be engaged by the roller and the switch-operating lever pivoted to the upper end of the upright lever.

9. In a switch-stand, the combination with the vertically-moving lever and the frame within which the lever moves, of the spring carried by the frame and the washer interposed between the end of the spring and the lever and bearing on the frame; whereby the lever is relieved of the direct pressure of the spring.

10. In a switch-stand, the combination of the spring-carrying frame, the vertical shaft sustaining the same and having a flattened portion, the pivoted operating lever having its end forked to receive the end of the shaft, the vertically-moving lever connected to the switch-operating lever, and the spring sustained by the frame.

11. In a switch-stand, of the type herein described, the combination of the spring carrying frame provided with the transverse and longitudinal slots, of the vertically movable lever having its lower end formed to fit within the transverse slot and the portion of the lever above the same formed to enter the longitudinal slot, and the spring sustained by the frame and acting on the lever; whereby the lateral motion of the lever with relation to the frame is permitted only when the lever is lowered.

12. In combination with the switch operating shaft, its yielding crank pin, and the spring, the shaft operating lever E, and the stand or frame with means for locking the lever thereto only in position to hold the switch for the main line.

In testimony whereof I hereunto set my hand, this 16th day of July, 1892, in the presence of two attesting witnesses.

ROBERT H. CANFIELD.

Witnesses:
F. H. PERRY,
THOS. MCAVOY.